United States Patent
Carpenter

(10) Patent No.: US 6,971,401 B1
(45) Date of Patent: Dec. 6, 2005

(54) PROTECTIVE COVER FOR VALVE STEMS AND THE LIKE

(76) Inventor: Samuel B. Carpenter, 6356 Eldridge Rd., Lake Charles, LA (US) 70607

( * ) Notice: Subject to any disclaimer, the term of this patent is extended or adjusted under 35 U.S.C. 154(b) by 0 days.

(21) Appl. No.: 11/099,893

(22) Filed: Apr. 7, 2005

(51) Int. Cl.[7] .............................. F16K 27/08
(52) U.S. Cl. ............... 137/382; 137/377; 137/559; 251/266
(58) Field of Search .............. 137/377, 382, 137/551, 559; 251/266

(56) References Cited

U.S. PATENT DOCUMENTS

| | | | |
|---|---|---|---|
| 1,664,694 A * | 4/1928 | Lovvorn | 137/382 |
| 2,379,529 A | 7/1945 | Kennedy | |
| 2,578,630 A * | 12/1951 | Hartman | 74/89.23 |
| 2,973,774 A * | 3/1961 | Clure | 137/382 |
| 3,067,630 A * | 12/1962 | Hartman | 74/608 |
| D258,693 S | 3/1981 | L'Heureux | |
| 4,407,324 A * | 10/1983 | Caddell | 137/382 |
| 4,453,618 A | 6/1984 | Economaki | |
| 5,299,883 A | 4/1994 | Arth, Jr. | |
| 5,908,048 A | 6/1999 | Van Driel | |
| 6,520,212 B1 | 2/2003 | Blivet | |

* cited by examiner

Primary Examiner—A. Michael Chambers

(57) ABSTRACT

An apparatus includes a cylindrical body that is formed from soft and resilient material and has a smooth outer surface provided with surface indicia coated thereon that has a fluorescent color for drawing attention thereto. The body further has a bore formed therein that extends through the length thereof and has an open and a closed end portion. An aperture is formed in the body that penetrates the body and terminates laterally of the bore. A sleeve formed from rigid material is nested within the bore, confronts an interior surface of the body and spans between the open and closed end portions of the body. A tether is included that has opposed end portions connected to the body and the valve assembly. The tether is attached proximate to one end portion of the body such that the apparatus can be detached while the tether remains engaged with the valve assembly.

15 Claims, 3 Drawing Sheets

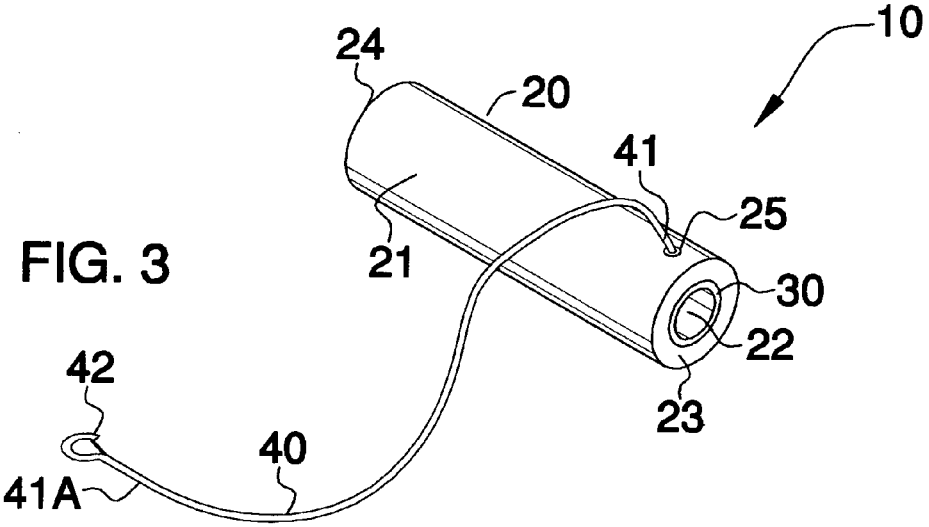
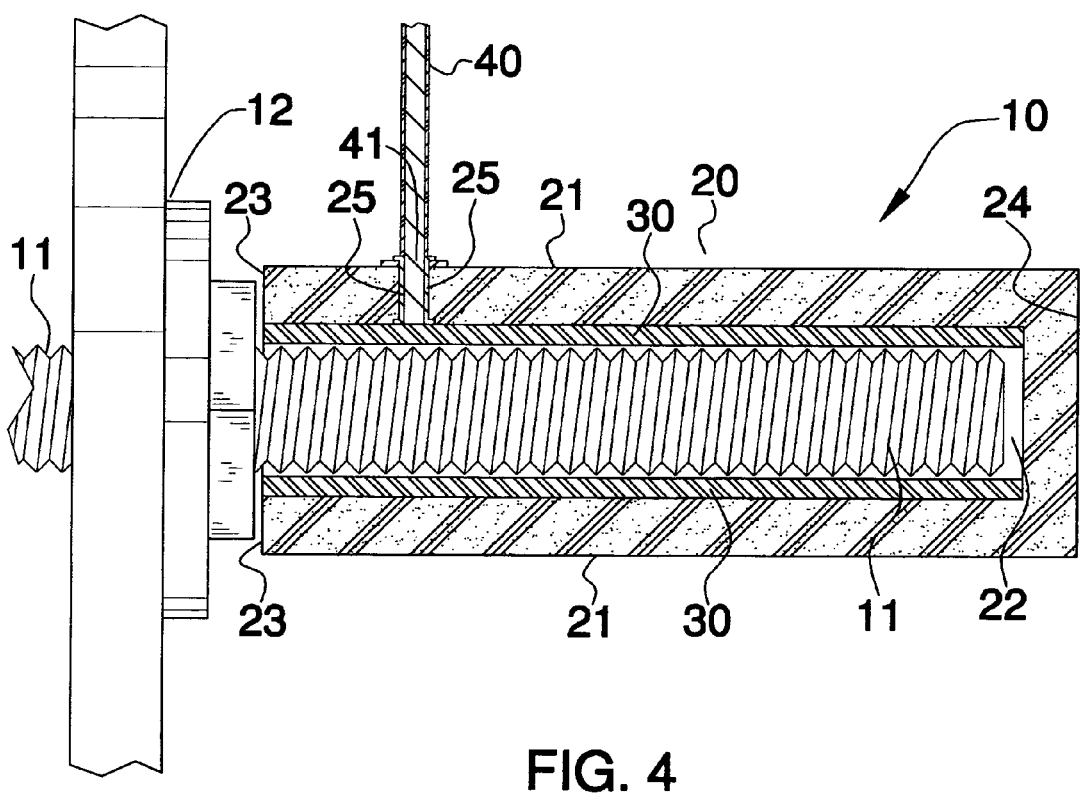

PROTECTIVE COVER FOR VALVE STEMS AND THE LIKE

CROSS REFERENCE TO RELATED APPLICATIONS

Not Applicable.

STATEMENT REGARDING FEDERALLY SPONSORED RESEARCH OR DEVELOPMENT

Not Applicable.

REFERENCE TO A MICROFICHE APPENDIX

Not Applicable.

BACKGROUND OF THE INVENTION

1. Technical Field

This invention relates to protective covers and, more particularly, to a protective cover for valve stems and the like for shielding an operator from an industrial sized valve stem protruding outwardly from a valve assembly.

2. Prior Art

There are many safety hazards associated with working in a large industrial building. Often times, the products that are being produced require extreme temperature and pressure conditions to form properly. As such, the tubes and pipes involved in this process, where materials, excess waste gas or cooling water may pass through, are rather large to try and decrease the pressure buildup that often occurs therein.

At times, the mere diameter of the piping and tubing is not sufficient to relieve the strains of these pressures, and as such, valves are provided to relieve the pressure at appropriate times or during emergency situations. Although the valve is a safety feature in itself, it also introduces a threat into the working environment.

In general, the design of the industrial valve includes a rectilinear rod with a threaded outer surface, more commonly known as the stems of the valve that extend orthogonal to the pipe. An annular handle is rotatable about the stem, which in turn controls the opening and closing of the valve. Unfortunately, the length of the stem is much greater than the width of the annular handle attached thereto, thus causing a portion of the stem to extend beyond and away from the handle. The exposed end of the stem can thus cause serious injury if a person does not take notice thereof and they walk into it. This is especially true since such industrial valves tend to be found at various levels along a person's line of sight, and are not always necessarily at eye-level where they can be easily spotted.

Accordingly, a need remains for a protective cover for valve stems and the like in order to overcome the above-noted shortcomings. The present invention satisfies such a need by providing a protective cover that is adaptable in use, durable in design, easy to install, and affords greater protection to those that work in the vicinity thereof. Such a protective cover for valve stems advantageously provides a cushioning shield between the stem of a valve and any workers who may inadvertently bump into it, thus preventing injuries. The protective cover also assists to maintain the lubricating coating applied to the valve stems, thereby preventing corrosion thereof.

BRIEF SUMMARY OF THE INVENTION

In view of the foregoing background, it is therefore an object of the present invention to provide a protective cover for valve stems and the like. These and other objects, features, and advantages of the invention are provided by an apparatus for shielding an operator from an industrial sized valve stem protruding outwardly from a valve assembly.

The apparatus includes a cylindrical body sized and shaped for fitting about the valve stem. Such a body is formed from soft, preferably non-corrosive and resilient material, and has a smooth outer surface extending about a longitudinal length of the valve stem. The outer surface is provided with surface indicia coated thereon wherein the surface indicia have a fluorescent color for advantageously drawing attention towards the valve stem. The body further has a centrally disposed longitudinal axis passing therethrough and a bore axially formed therein wherein the bore uniformly extends through the longitudinal length of the body.

Such a body also has an open end portion and a closed end portion oppositely spaced therefrom in such a manner that the body can effectively be slidably positioned about the valve stem without damaging the body. The body further has an aperture formed therein and situated transverse to the bore wherein the aperture penetrates the body and terminates laterally of the bore. Such a body has a thickness greater than a thickness of the sleeve.

A sleeve formed from rigid and non-corrosive material, preferably from plastic, is nested within the bore. Such a sleeve confronts an interior surface of the body and maintains continuous surface area contact therewith such that the valve stem can advantageously not penetrate or pierce through the body during repeated use. The sleeve spans between the open and closed end portions of the body and maintains the valve stem spaced from the body. Such a sleeve may have a cylindrical shape and an annular cross-section.

A tether is included that has opposed end portions directly connected to the body and removably attached directly to a selected portion of the valve assembly such that the body can conveniently not be separated beyond a predetermined distance from the valve stem. Such a tether is attached proximate to one of the end portions of the body such that the apparatus can be readily detached while the tether remains engaged with the valve assembly. The tether preferably includes a fastening member attached to one of the end portions thereof for advantageously assisting an operator to quickly disconnect the apparatus from the valve assembly.

It is noted the purpose of the foregoing abstract is to enable the U.S. Patent and Trademark Office and the public generally, especially the scientists, engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

BRIEF DESCRIPTION OF THE SEVERAL VIEWS OF THE DRAWING

The novel features believed to be characteristic of this invention are set forth with particularity in the appended claims. The invention itself, however, both as to its organization and method of operation, together with further objects and advantages thereof, may best be understood by reference to the following description taken in connection with the accompanying drawings in which:

FIG. 3 is an enlarged perspective view of the apparatus shown in FIGS. 1 and 2; and FIG. 4 is a cross-sectional view of the apparatus shown in FIG. 1, taken along line 4—4.

DETAILED DESCRIPTION OF THE INVENTION

The present invention will now be described more fully hereinafter with reference to the accompanying drawings, in which a preferred embodiment of the invention is shown. This invention may, however, be embodied in many different forms and should not be construed as limited to the embodiment set forth herein. Rather, this embodiment is provided so that this application will be thorough and complete, and will fully convey the true scope of the invention to those skilled in the art. Like numbers refer to like elements throughout the figures.

Figure 1:
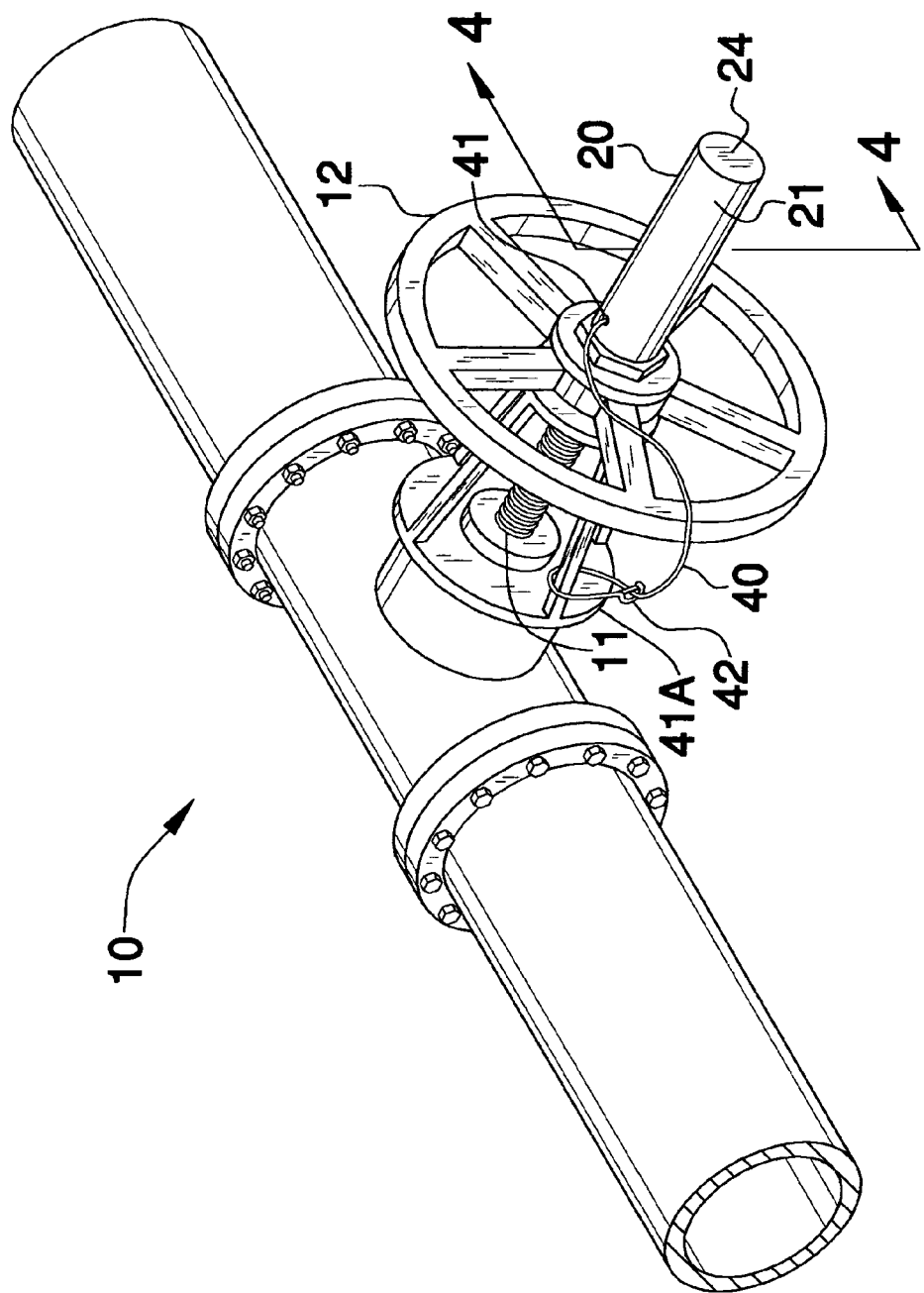
FIG. 1 is a perspective view showing a protective cover for valve stems and the like, in accordance with the present invention.
Figure 2:
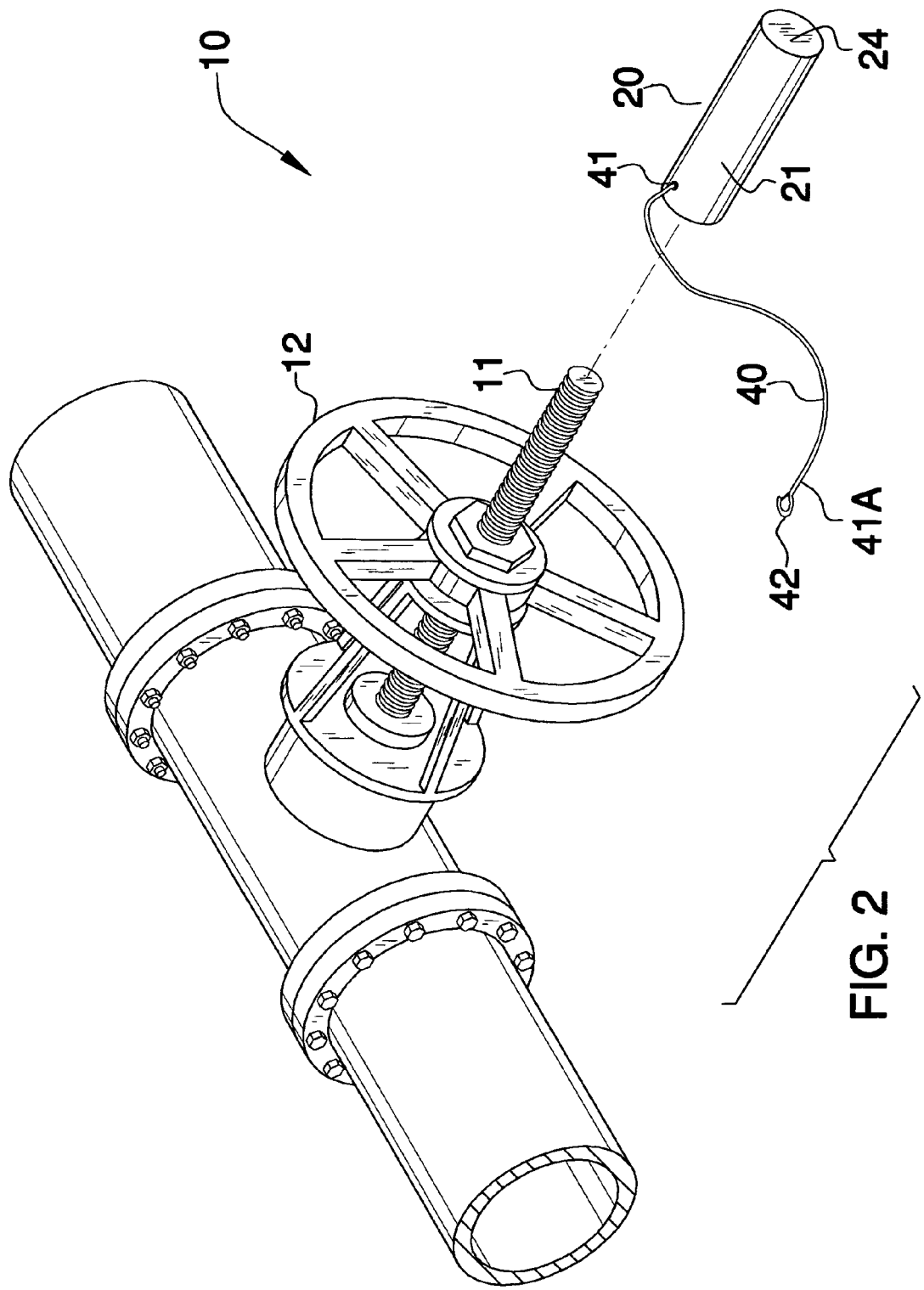
FIG. 2 is a perspective view of the apparatus shown in FIG. 1, showing same being removed from the valve assembly.

The apparatus of this invention is referred to generally in FIGS. 1–4 by the reference numeral 10 and is intended to provide a protective cover for valve stems and the like. It should be understood that the apparatus 10 may be used to cover many different types of protruding elements and should not be limited in use to only valve stems.

Referring initially to FIGS. 1 through 4, the apparatus 10 includes a cylindrical body 20 sized and shaped for fitting about the valve stem 11. Such a body 20 is formed from soft, non-corrosive and resilient material, and has a smooth outer surface 21 extending about a longitudinal length of the valve stem 11. The outer surface is provided with surface indicia coated thereon wherein the surface indicia have a fluorescent color that is essential for advantageously drawing attention towards the valve stem 11. Such surface indicia further increase the safety afforded by the apparatus 10 by not only limiting injury due to contact, but also eliminating unnecessary contact with the valve stem 11 by drawing a person's attention thereto. The body 20 further has a centrally disposed longitudinal axis passing therethrough and a bore 22 axially formed therein wherein the bore 22 uniformly extends through the longitudinal length of the body 20, as is best shown in FIG. 4.

Referring to FIGS. 3 and 4, such a body 20 also has an open end portion 23 and a closed end portion 24 oppositely spaced therefrom in such a manner that is critical for the body 20 to be effectively slidably positioned about the valve stem 11 without damaging the body 20. The body 20 further has an aperture 25 formed therein and situated transverse to the bore 22 wherein the aperture 25 penetrates the body 20 and terminates laterally of the bore 22. Such a body 20 has a thickness greater than a thickness of the sleeve 30 (described herein below).

Still referring to FIGS. 3 and 4, a sleeve 30 formed from rigid and non-corrosive material, like plastic, is nested within the bore 22. Of course, the sleeve 30 may be produced from a variety of different materials, like steel and aluminum for example, as is obvious to a person of ordinary skill in the art. Such a sleeve 30 confronts an interior surface of the body 20 and maintains continuous surface area contact therewith such that the valve stem 11 can advantageously not penetrate or pierce through the body 20 during repeated use.

The sleeve 30 spans between the open 23 and closed 24 end portions of the body 20 and is important for maintaining the valve stem 11 spaced from the body 10 to prevent structural damage from occurring. Such a sleeve 30 has a cylindrical shape and an annular cross-section. Of course, the body 20 and sleeve 30 may be produced in a variety of different lengths, diameters, shapes, and colors in order to fit a variety of valve stems, as is obvious to a person of ordinary skill in the art.

Referring to FIGS. 1 through 4, a tether 40 is included that has opposed end portions 41 directly connected, with no intervening elements, to the body 20 and removably attached directly, with no intervening elements, to a selected portion of the valve assembly 12 such that the body 20 can conveniently not be separated beyond a predetermined distance from the valve stem 11. The tether 40 thus, advantageously assists in preventing the apparatus 10 from being misplaced or lost, which saves the user a considerable amount of money and frustration. Such a tether 40 is attached proximate to one end portion 23 of the body 20 such that the apparatus 10 can be readily detached while the tether 40 remains engaged with the valve assembly 12. The tether 40 includes a fastening member 42 attached to one 41A of the end portions 41 thereof. Such a fastening member 42 is crucial for advantageously assisting an operator to quickly disconnect the apparatus 10 from the valve assembly 12.

While the invention has been described with respect to a certain specific embodiment, it will be appreciated that many modifications and changes may be made by those skilled in the art without departing from the spirit of the invention. It is intended, therefore, by the appended claims to cover all such modifications and changes as fall within the true spirit and scope of the invention.

In particular, with respect to the above description, it is to be realized that the optimum dimensional relationships for the parts of the present invention may include variations in size, materials, shape, form, function and manner of operation. The assembly and use of the present invention are deemed readily apparent and obvious to one skilled in the art.

What is claimed as new and what is desired to secure by Letters Patent of the United States is:

1. An apparatus for shielding an operator from an industrial sized valve stem protruding outwardly from a valve assembly, said apparatus comprising:

a cylindrical body sized and shaped for fitting about the valve stem, said body being formed from soft and resilient material and having a smooth outer surface extending about a longitudinal length of the valve stem, said outer surface being provided with surface indicia coated thereon wherein the surface indicia has a fluorescent color for drawing attention towards the valve stem, said body further having a centrally disposed longitudinal axis passing therethrough and a bore axially formed therein wherein the bore uniformly extends through the longitudinal length of said body, said body further having an open end portion and a closed end portion oppositely spaced therefrom in such a manner that said body can be slidably positioned about the valve stem without damaging said body, said body further having an aperture formed therein and situated transverse to the bore wherein the aperture penetrates said body and terminates laterally of the bore;

a sleeve formed from rigid and non-corrosive material nested within the bore, said sleeve confronting an interior surface of said body and maintaining continuous surface area contact therewith such that the valve stem can not penetrate or pierce through said body during repeated use, said sleeve spanning between said open and closed end portions of said body and maintaining the valve stem spaced from said body; and a tether having opposed end portions directly connected to said body and removably attached directly to a selected portion of the valve assembly such that said body can not be separated beyond a predetermined distance from the valve stem.

2. The apparatus of claim 1, wherein said sleeve is formed from plastic.

3. The apparatus of claim 2, wherein said sleeve has a cylindrical shape and an annular cross-section.

4. The apparatus of claim 3, wherein said tether comprises: a fastening member attached to one said end portions thereof for assisting an operator to quickly disconnect said apparatus from the valve assembly.

5. The apparatus of claim 4, wherein said body is formed from non-corrosive material.

6. An apparatus for shielding an operator from an industrial sized valve stem protruding outwardly from a valve assembly, said apparatus comprising:

a cylindrical body sized and shaped for fitting about the valve stem, said body being formed from soft and resilient material and having a smooth outer surface extending about a longitudinal length of the valve stem, said outer surface being provided with surface indicia coated thereon wherein the surface indicia has a fluorescent color for drawing attention towards the valve stem, said body further having a centrally disposed longitudinal axis passing therethrough and a bore axially formed therein wherein the bore uniformly extends through the longitudinal length of said body, said body further having an open end portion and a closed end portion oppositely spaced therefrom in such a manner that said body can be slidably positioned about the valve stem without damaging said body, said body further having an aperture formed therein and situated transverse to the bore wherein the aperture penetrates said body and terminates laterally of the bore;

a sleeve formed from rigid and non-corrosive material nested within the bore, said sleeve confronting an interior surface of said body and maintaining continuous surface area contact therewith such that the valve stem can not penetrate or pierce through said body during repeated use, said sleeve spanning between said open and closed end portions of said body and maintaining the valve stem spaced from said body; and a tether having opposed end portions directly connected to said body and removably attached directly to a selected portion of the valve assembly such that said body can not be separated beyond a predetermined distance from the valve stem;

wherein said tether is attached proximate to one said end portions of said body such that said apparatus can be readily detached while said tether remains engaged with the valve assembly.

7. The apparatus of claim 6, wherein said sleeve is formed from plastic.

8. The apparatus of claim 7, wherein said sleeve has a cylindrical shape and an annular cross-section.

9. The apparatus of claim 8, wherein said tether comprises: a fastening member attached to one said end portions thereof for assisting an operator to quickly disconnect said apparatus from the valve assembly.

10. The apparatus of claim 9, wherein said body is formed from non-corrosive material.

11. An apparatus for shielding an operator from an industrial sized valve stem protruding outwardly from a valve assembly, said apparatus comprising:

a cylindrical body sized and shaped for fitting about the valve stem, said body being formed from soft and resilient material and having a smooth outer surface extending about a longitudinal length of the valve stem, said outer surface being provided with surface indicia coated thereon wherein the surface indicia has a fluorescent color for drawing attention towards the valve stem, said body further having a centrally disposed longitudinal axis passing therethrough and a bore axially formed therein wherein the bore uniformly extends through the longitudinal length of said body, said body further having an open end portion and a closed end portion oppositely spaced therefrom in such a manner that said body can be slidably positioned about the valve stem without damaging said body, said body further having an aperture formed therein and situated transverse to the bore wherein the aperture penetrates said body and terminates laterally of the bore;

wherein said body has a thickness greater than a thickness of said sleeve;

a sleeve formed from rigid and non-corrosive material nested within the bore, said sleeve confronting an interior surface of said body and maintaining continuous surface area contact therewith such that the valve stem can not penetrate or pierce through said body during repeated use, said sleeve spanning between said open and closed end portions of said body and maintaining the valve stem spaced from said body; and a tether having opposed end portions directly connected to said body and removably attached directly to a selected portion of the valve assembly such that said body can not be separated beyond a predetermined distance from the valve stem;

wherein said tether is attached proximate to one said end portions of said body such that said apparatus can be readily detached while said tether remains engaged with the valve assembly.

12. The apparatus of claim 11, wherein said sleeve is formed from plastic.

13. The apparatus of claim 12, wherein said sleeve has a cylindrical shape and an annular cross-section.

14. The apparatus of claim 13, wherein said tether comprises: a fastening member attached to one said end portions thereof for assisting an operator to quickly disconnect said apparatus from the valve assembly.

15. The apparatus of claim 14, wherein said body is formed from non-corrosive material.

* * * * *